United States Patent
Singh et al.

(10) Patent No.: US 10,338,845 B1
(45) Date of Patent: Jul. 2, 2019

(54) SELF-ERASING PORTABLE STORAGE DEVICES

(71) Applicant: Amazon Technologies, Inc., Seattle, WA (US)

(72) Inventors: Prashant Singh, Sammamish, WA (US); Stephen Christopher Trier, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 77 days.

(21) Appl. No.: 15/457,504

(22) Filed: Mar. 13, 2017

Related U.S. Application Data

(63) Continuation of application No. 15/254,581, filed on Sep. 1, 2016, now abandoned.

(51) Int. Cl.
*G11C 16/04* (2006.01)
*G06F 3/06* (2006.01)

(52) U.S. Cl.
CPC .......... *G06F 3/0652* (2013.01); *G06F 3/0622* (2013.01); *G06F 3/0637* (2013.01); *G06F 3/0673* (2013.01)

(58) Field of Classification Search
CPC .... G06F 3/0652; G06F 3/0673; G06F 3/0622; G06F 3/0637
USPC ..................................................... 365/185.04
See application file for complete search history.

(56) References Cited

U.S. PATENT DOCUMENTS

| | | | |
|---|---|---|---|
| 6,236,586 B1 | 5/2001 | Morisaki et al. | |
| 6,370,603 B1 | 4/2002 | Silverman et al. | |
| 8,521,984 B2 | 8/2013 | Asano et al. | |
| 8,738,935 B1 | 5/2014 | Brooker et al. | |
| 9,152,505 B1 | 10/2015 | Brooker et al. | |
| 9,177,122 B1 | 11/2015 | Trier | |
| 2002/0049917 A1* | 4/2002 | Portman | G06F 1/30 713/300 |
| 2003/0005336 A1* | 1/2003 | Poo | G06F 21/32 726/5 |
| 2005/0105055 A1 | 5/2005 | Olson et al. | |
| 2006/0050622 A1 | 3/2006 | So et al. | |
| 2006/0075487 A1 | 4/2006 | Pfleging et al. | |

(Continued)

OTHER PUBLICATIONS

U.S. Appl. No. 14/624,480, U.S. Patent Application, filed Feb. 17, 2015, Titled: Tamper Detection for Hardware Devices.

(Continued)

*Primary Examiner* — Tha-O H Bui
(74) *Attorney, Agent, or Firm* — Kilpatrick Townsend & Stockton LLP

(57) ABSTRACT

Techniques for securely destroying data stored on a portable storage device may be provided. For example, a portable storage device includes a first memory configured to store data while a current is supplied by a second device or a capacitor of the first device. One or more capacitors of the portable device may be configured to store a charge to provide the current to the first memory. A processor that is configured to access computer-executable instructions of a second memory of the first device may provide instructions to enable transfer of the data stored in the first memory to the second device. In particular embodiments, the data stored in the first memory may be erased in response to the current no longer being provided by the second device or the one or more capacitors.

18 Claims, 7 Drawing Sheets

(56) References Cited

U.S. PATENT DOCUMENTS

| | | |
|---|---|---|
| 2006/0107071 A1 | 5/2006 | Girish et al. |
| 2006/0219776 A1* | 10/2006 | Finn ................ B60R 25/25 235/380 |
| 2006/0226950 A1 | 10/2006 | Kanou et al. |
| 2007/0113029 A1 | 5/2007 | Bennett et al. |
| 2007/0129813 A1 | 6/2007 | Ferchau et al. |
| 2007/0223696 A1 | 9/2007 | Furuyama |
| 2008/0201544 A1 | 8/2008 | Nakajima et al. |
| 2008/0263345 A1 | 10/2008 | Booth et al. |
| 2009/0172639 A1 | 7/2009 | Natu et al. |
| 2009/0182930 A1 | 7/2009 | Taguchi et al. |
| 2009/0327756 A1 | 12/2009 | Pekowsky et al. |
| 2010/0008175 A1* | 1/2010 | Sweere ............ G06F 12/0866 365/229 |
| 2010/0127856 A1 | 5/2010 | Sipple et al. |
| 2010/0185843 A1 | 7/2010 | Olarig et al. |
| 2010/0281202 A1 | 11/2010 | Abali et al. |
| 2010/0299555 A1 | 11/2010 | Jepson et al. |
| 2010/0325736 A1 | 12/2010 | Sadovsky et al. |
| 2011/0072209 A1 | 3/2011 | Lund et al. |
| 2011/0218965 A1 | 9/2011 | Lee et al. |
| 2011/0252242 A1 | 10/2011 | Ureche et al. |
| 2011/0258411 A1 | 10/2011 | Sato |
| 2011/0307724 A1 | 12/2011 | Shaw et al. |
| 2012/0278529 A1 | 11/2012 | Hars et al. |
| 2012/0278579 A1 | 11/2012 | Goss et al. |
| 2013/0160139 A1 | 6/2013 | Goel et al. |
| 2013/0269011 A1 | 10/2013 | Wilson et al. |
| 2016/0191235 A1* | 6/2016 | Kim ................ G06F 3/0622 713/193 |

OTHER PUBLICATIONS

U.S. Appl. No. 14/857,705, U.S. Patent Application, filed Sep. 17, 2015, Titled: Secure Erase of Storage Devices.

* cited by examiner

SELF-ERASING PORTABLE STORAGE DEVICES

CROSS-REFERENCE TO RELATED APPLICATIONS

This application is a Continuation of U.S. patent application Ser. No. 15/254,581, filed on Sep. 1, 2016, and entitled "SELF-ERASING PORTABLE STORAGE DEVICES," the content of which is herein incorporated by reference in its entirety.

BACKGROUND

As more entities require the storage of various data (business data, personal data, sensitive data, etc.), large portions of the data may be stored in data centers. As such, security concerns for the data of the data centers will likely continue and may even increase. However, some data may need to be transferred to or between storage devices, like servers, in a data center. Portable storage devices may be utilized to transfer sensitive data between storage devices within a data center. However, it may be desired that such portable storage devices and the data stored thereon not leave the data center. As such, managing the secure erasure of the data from the portable storage device while enabling the transfer of the stored data to other storage devices and/or computer devices may pose challenges to users, entities, and data providers.

BRIEF DESCRIPTION OF THE DRAWINGS

Various embodiments in accordance with the present disclosure will be described with reference to the drawings, in which.

DETAILED DESCRIPTION

Figure 1:
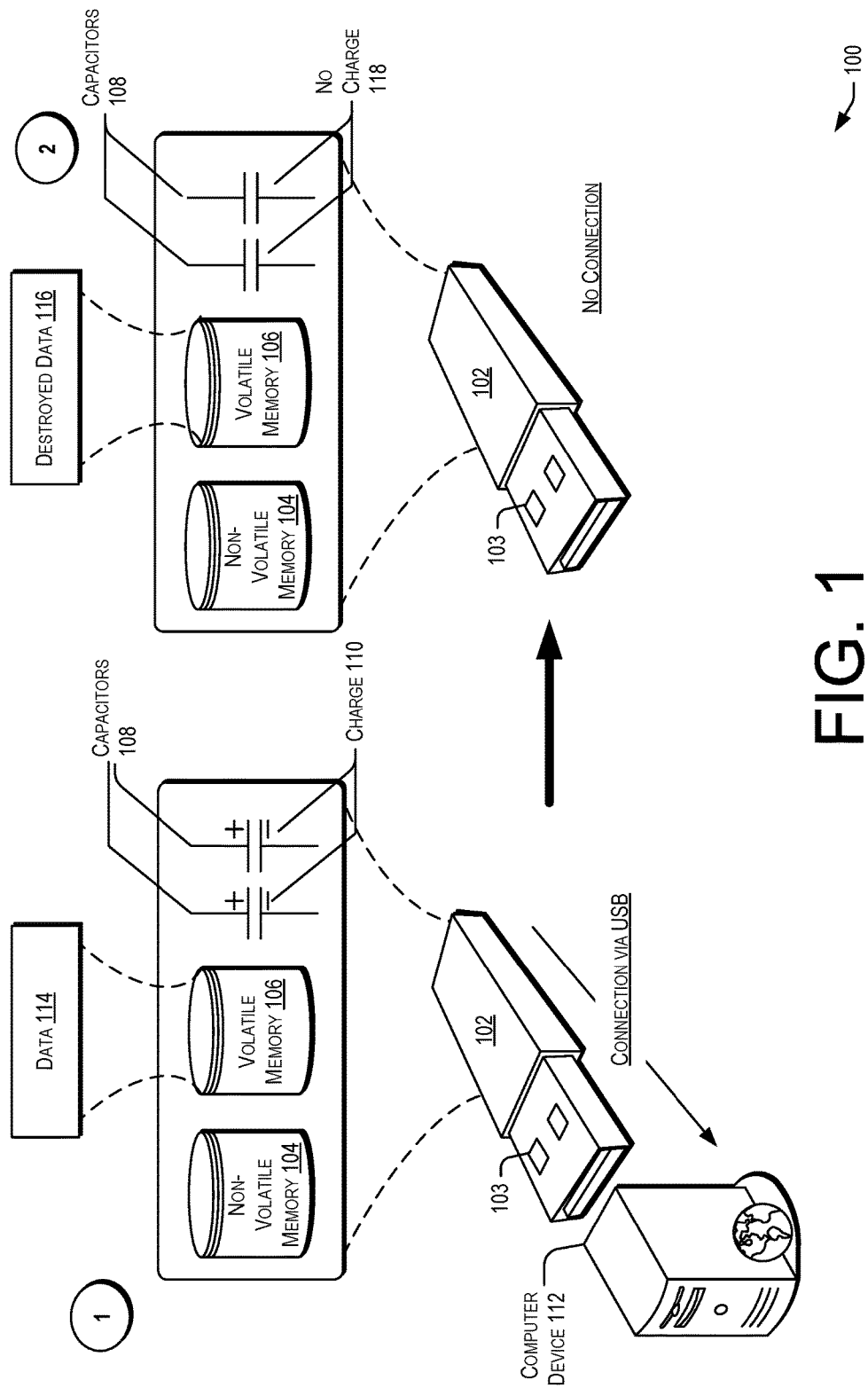
FIG. 1 illustrates an example environment for implementing the secure erasure of data on a portable storage device as described herein, according to at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, providing a secure destruction feature for data stored on portable storage devices. In particular embodiments, the portable storage devices may be used in a data storage center to transfer data. In some examples, a data storage center may include a storage area including one or more server racks that store a plurality of storage devices. The storage devices may be associated with an electronic marketplace or other suitable entity for storing data on behalf of users, customers, third parties, and other entities. The storage devices may be configured to provide scalable data storage capacity for information generated or provided by the users, customers, third parties, or other entities. In some embodiments, the data stored in the data center may be sensitive data (personal information, bank account information, credit/debit card information, pictures, movies, documents, etc.,) that should not leave the data center to ensure privacy and security. The storage devices can include, for example, hard drives, solid-state drives (SSDs), other devices, or a combination of any of these.

In various embodiments, data may be transferred between the storage devices in the data center or new data may need to be transferred to the storage devices in the data center. A portable storage device (such as a universal serial bus (USB) flash drive or other device) may be used to quickly transfer data to a storage device or between several storage devices. Embodiments disclosed herein include a portable storage device configured to store data in volatile memory. The portable storage device may include one or more capacitors that are configured to be charged, and to store a charge, while interacting with or connected to a computer device/ storage device (e.g., through a USB port or other port that can provide power to the portable storage device). While the illustrated examples and disclosure herein discusses capacitors, it should be noted that any suitable energy storage device may be utilized such as batteries, inductors, fuel cells, flywheels, springs, etc. Further, embodiments described herein include utilizing a single capacitor or multiple capacitors that can be charged and store a charge. The capacitors may also provide a current to the volatile memory to maintain the data stored thereon. The data stored in the volatile memory is destroyed when the portable storage device is no longer connected to or interacting with a computer device and when the energy stored in the capacitors is insufficient to maintain the data. For example, the capacitor may no longer provide a sufficient current to refresh the volatile memory where the data is stored. Thus, embodiments described herein enable secure storage and erasure of data absent instructions or user interaction from a user. Instead, the portable storage device is configured to store the data in volatile memory, and the stored data is erased when the volatile memory no longer receives a sufficient current from the capacitors of the portable storage device. By utilizing the configuration described herein, users are able to safely store, transfer, and erase data. As such, when a connection between the portable storage device and a computer device/storage device is terminated (e.g., the portable storage device is removed from the computer device) and upon expiration of a time period during which the capacitor provides current to the volatile memory, the data stored in the volatile memory may be erased, destroyed, deleted, dereferenced, or otherwise made inaccessible. In some examples, the volatile memory may lose all trace of the data stored thereon when power and/or current ceases to be provided to the volatile memory, thus enabling a secure erase of the data. Portable storage devices can be produced with particular configurations of capacitors and memory sizes, refresh speeds, access speed, etc., to determine a time period that a current will be provided before data is erased. In data center scenarios, the time period can correspond to the physical size of the data center such that users are prevented from leaving the data center before the data is erased.

In a non-limiting example, a user in a data center may wish to transfer data securely from one server rack to another, utilizing a portable storage device (in this use case, a USB drive). The user may load the data on the USB drive in any suitable way and provide an initial charge to a capacitor of the USB drive that will in turn provide a current to the volatile memory where the data is stored. The USB drive is configured to maintain the data in the volatile memory only so long as a current is provided, either by the associated capacitor of the USB drive or by another computing device. Thereafter, the USB drive will lose or be unable to access the data in the volatile memory by nature of the volatile memory lacking the power to refresh and maintain the stored data. To continue the example, upon loading the data on the USB drive, the user may interact or connect the USB drive to one or more storage devices in a server rack to perform transfer or installation operations. As the user disconnects the USB drive from any suitable computer device, the USB drive is configured to maintain the data stored in the volatile memory for a time period that corresponds to the charge stored in the associated capacitor and the size and refresh rate of the volatile memory. Thus, the user only has a limited amount of time to interact with other computing devices before the USB drive will lose the data stored in the volatile memory. This reduces the chance that the user will leave the data center with potentially sensitive data still intact on the USB drive. Further, this provides for secure reuse of the USB drive to perform other transfer operations as a user can pick up and utilize the USB drive with the assurance that all previously stored data has been lost after a time period.

In some embodiments, the portable storage device may include other mechanisms for erasing the data stored in the volatile memory. In particular embodiments, the portable storage device may include a mechanical switch and/or button that can be interacted with by a user to cause the capacitor to stop providing a current to the volatile memory and thus erase the data stored in the volatile memory. In some embodiments, the user interaction with the mechanical switch may cause the capacitors to drain or expend their stored charge at an accelerated rate (e.g., in a fraction of a second) thus causing the volatile memory to erase the stored data. In various embodiments, a portable storage device may be configured to utilize a geolocation system to implement a geo-fence trigger for stopping the capacitors from providing current to the volatile memory or causing the capacitors to expend the stored charge at an accelerated rate. For example, a geo-fence virtual barrier may be implemented by an entity, such as an administrator of a data center, such that when a portable storage device exits the bounded area created by the virtual barrier, a trigger is activated which causes the destruction of the data stored in the virtual memory via the capacitor as described above. Examples of the geolocation system include global positioning system (GPS) radio frequency identification (RFID) components, radio triangulation components, cell tower identities, or long range navigation (LORAN) components.

The portable storage device may include firmware or other instructions on non-volatile memory that can be executed by an associated processor to provide GPS or RFID information to a service provider computer that maintains and processes information that triggers the destruction of the data stored in the volatile memory of the portable storage device. In some embodiments, the portable storage device may be configured with one or more wireless network capabilities such as WiFi. Instructions may be provided by the portable storage device that cause the destruction of the data stored in the virtual memory when the portable storage device disconnects from a particular wireless access point of a location. For example, a portable storage device may be configured to access network capability via a home or base network. When the portable storage device fails to connect to such a network or attempts to connect to another network, a trigger may be activated that causes the associated capacitors to cease providing current or expend the stored charge that in turn causes the volatile memory to destroy the data stored thereon. The triggers described herein for causing a capacitor of a portable storage device to accelerate its expenditure of a stored charge or stop providing a charge can be implemented independent of a connection to a computer device or while connected to a computer device to ensure security and privacy of stored data. In particular embodiments, the portable storage device may be configured with one or more capacitors of different sizes that are capable of storing varied charges of power and provide current for varying amounts of time to the volatile memory. In some embodiments, a user may interact with a switch or other user interface to select the amount of time they desire for the memory to maintain the data stored thereon. For example, based on a selection of a particular time period, the portable storage device and capacitors may be configured to store a charge in a portion of the available capacitors to correspond to the particular time period.

FIG. 1 illustrates an example environment for implementing the secure erasure of data on a portable storage device as described herein, according to at least one embodiment. In illustrative environment 100 step 1, a portable USB device 102 may be provided for enabling secure destruction of data stored in volatile memory of the portable USB device 102 after a time period. In some examples, the portable USB device 102 may be configured with a USB connector 103, non-volatile memory 104, volatile memory 106, and one or more capacitors 108. In some embodiments, the portable USB device 102 may include one or more processor and/or controllers. The portable USB device 102 and the one or more capacitors 108 may be configured to receive power and store a charge 110 when interacting or connected with a computer device 112. The portable USB device 102 may interact or connect with the computer device 112 via a USB connection and the USB connector 103. In some embodiments, the portable USB device 102 may be configured to store data 114 in the volatile memory 106. In various embodiments, the portable USB device 102 may be configured to transfer the stored data 114 between the volatile memory 106 and the computer device 112. The computer device 112 may be associated with one or more storage devices. In some examples, the computer device 112 may include a laptop computer, a desktop computer, a server computer, a portable computer device, a wearable device, a network switch, a network router, or any suitable computer device with a processor, memory, and computer storage.

As described herein, the portable USB device 102 may be utilized to store data 114 in the volatile memory 106 for transferring the data 114 to one or more computer devices (such as 112) within a data center or any other suitable setting such as a home or workplace. In particular embodiments, the data 114 stored in the volatile memory 106 will be destroyed after a time period as current will not be provided by a connected device (computer device 112) or the capacitors 108 as the capacitors 108 are configured to store a finite charge. As such, the portable USB device 102 can be utilized to store potentially sensitive data, transfer said data, and ensure that the data will be destroyed after an amount of time has passed as the capacitor 108 will fail to provide current when the stored charge has run out. Embodiments disclosed herein provide systems and methods for destroying the data without further input from a user or other instructions from other computer devices (such as computer device 112). Additionally, as the capacitors 108 can only store a finite amount of charge 110, the data 114 stored in the volatile memory 106 can be confined to a physical space as the portable USB device 102 can only travel a given distance before the data is destroyed.

In the illustrative environment 100, the portable USB device 102 may be disconnected or no longer connected to the computer device 112 (denoted by step 2). In some embodiments, after an amount of time that is determined by the size of the capacitors 108, the stored charge 110, and the size and refresh rate of the volatile memory 106, the data may be destroyed 116. Step 2 of illustrative environment 100 illustrates that the capacitors 108 no longer store a charge 118. As described herein, because the data is stored in the volatile memory 106 when a current is no longer provided by the computer device 112 or the capacitors 108, the data will be erased and/or destroyed. In some embodiments, the non-volatile memory 104 may include instructions and/or firmware which configure the portable USB device 102 to transfer the data 114 or store the data 114 in the volatile memory 106 and/or for operating the portable USB device 102. In some embodiments, the non-volatile memory 104 may be configured to store identification information of the portable USB device 102 (e.g., a MAC address or other unique identifier) and/or authentication information of the portable USB device 102 (e.g., a private or public key). In some embodiments, the authentication information may be utilized to authenticate the portable USB device 102 before a data transfer process can occur. This authentication information and process may occur via a service provider computer and one or more communication networks such as the Internet (not pictured). While reference is made throughout to the portable USB device 102, it should be understood that any connector-type that enables the provisioning of power to a portable storage device may be used for implementing the features described herein. As such, the portable USB device 102 could easily be described throughout, without parting from the intent of the disclosure, as a portable Firewire device 102, a portable Thunderbolt device 102, a portable eSATA device 102, or the like.

Figure 2:
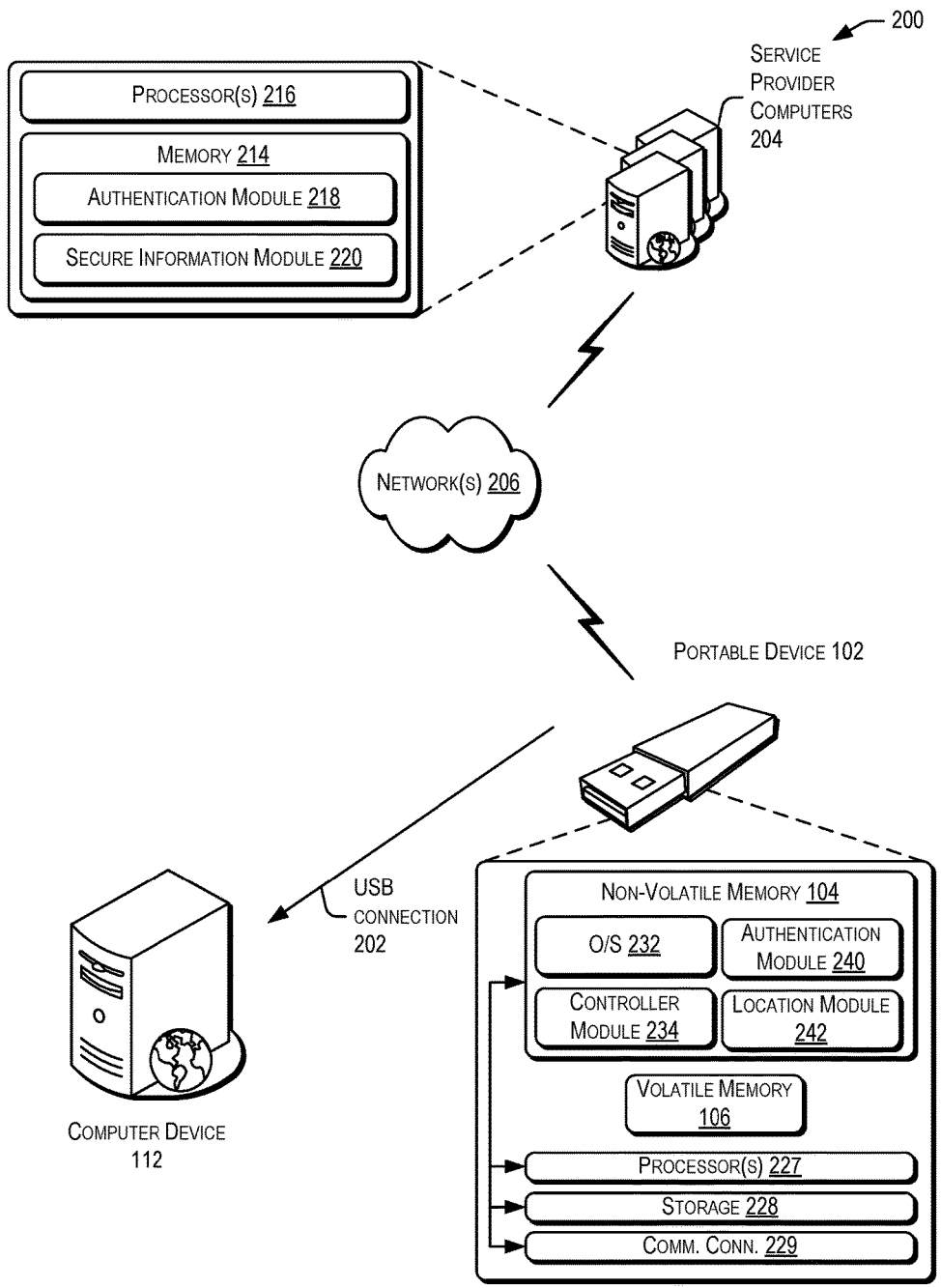
FIG. 2 illustrates an example architecture for implementing the secure erasure of data on a portable storage device as described herein that includes at least one computer device, one portable device, and one service provider computer connected via one or more networks, according to at least one embodiment.

FIG. 2 illustrates an example architecture for implementing the secure erasure of data on a portable storage device as described herein that includes at least one computer device, one portable device, and one service provider computer connected via one or more networks, according to at least one embodiment. In architecture 200, a portable USB device 102 may be configured to establish a USB connection 202 with a computer device 112 for transferring data and storing a charge to one or more associated capacitors as illustrated in FIG. 1. As noted above, upon connection 202, the computer device 112 may provide electrical power to the portable USB device 102 via the USB connection 202 that is stored in one or more capacitors 108. Once powered, the portable USB device 102 may perform data transfer operations and data storage operations for an amount of time that is determined by the charge stored in the capacitors upon the portable USB device being disconnected from a power source (other computer device). In some embodiments, one or more service provider computers 204 may authenticate or transfer secure information via one or more networks 206 to the portable device 102.

In some examples, the networks 206 may include any one or a combination of many different types of networks, such as cable networks, the Internet, wireless networks, cellular networks and other private and/or public networks. While the illustrated example represents the portable USB device 102 accessing the service provider computers 204 over the networks 206, the described techniques may equally apply in instances where the portable USB device 102 interacts with the service provider computers 204 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

In some aspects, the one or more service provider computers 204 may, in some examples, provide computing resources such as, but not limited to, client entities, low latency data storage, durable data storage, data access, management, virtualization, cloud-based software solutions, electronic content performance management, etc. The one or more service provider computers 204 may also be operable to provide web hosting, computer application development, and/or implementation platforms, combinations of the foregoing, or the like to one or more users or other entities. The one or more service provider computers 204, in some examples, may provide secure data management including, but not limited to, storing data, software updates such as drivers, and/or cryptographic information.

As described briefly above, portable USB device 102 may allow a data transfer between it and the computer device 112, such as to update firmware of appropriate hardware components and/or to enable storage of cryptographic keys for secure booting. The one or more service provider computers 204, perhaps arranged in a cluster of servers or as a server farm, may host applications and/or cloud-based software services. Other server architectures may also be used to host the cloud-based software services.

The service provider computers 204 may be any type of computing device such as, but not limited to, a server, a mobile phone, a smart phone, a personal digital assistant (PDA), a laptop computer, a desktop computer, a thin-client device, a tablet PC, an electronic book (e-book) reader, etc. In some examples, the service provider computers 204 may be able to communicate with the portable USB device 102 via the networks 206, or via other network connections. Additionally, the service provider computers 206 may be part of a distributed system. Additionally, it should be noted that in some embodiments, the service provider computers are executed by one more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment. The service provider computers 206 may include one or more servers, perhaps arranged in a cluster, as a server farm, or as individual servers not associated with one another. These servers may be configured to implement the data security features described herein as part of an integrated, distributed computing environment.

In one illustrative configuration, the service provider computers 204 may include at least one memory 214 and one or more processing units (or processor(s)) 216. The processor(s) 216 may be implemented as appropriate in hardware, computer-executable instructions, firmware, or combinations thereof. Computer-executable instruction or firmware implementations of the processor(s) 216 may include computer-executable or machine-executable instructions written in any suitable programming language to perform the various functions described.

The memory 214 may store program instructions that are loadable and executable on the processor(s) 216, as well as data generated during the execution of these programs. Depending on the configuration and type of the service provider computers 204, the memory 214 may be volatile (such as random access memory (RAM)) and/or non-volatile (such as read-only memory (ROM), flash memory, etc.). The service provider computer 204 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 214 may include multiple different types of memory, such as static random access memory (SRAM), dynamic random access memory (DRAM), or ROM.

Turning to the contents of the memory 214 in more detail, the memory 214 may include an operating system and one or more application programs or services for implementing the features disclosed herein including at least an authentication module 218 and/or a secure information module 220. In some example, the authentication module 218 may be configured to authenticate the portable USB device 102 and/or requests from the portable USB device 102. In some examples, as noted above, the authentication module 218 may determine, based at least in part on a MAC address or IP address associated with the portable USB device 102, that the portable USB device 102 is authorized to receive and/or transfer data. In which case, the authentication module 218 may indicate to the secure information module 220 that secure information may be provided to the portable USB device 102. In other examples, however, the MAC or IP address of the portable USB device 102 may be utilized by the authentication module 218 to identify that authentication credentials may be provided to the portable USB device 102. In this case, the authentication module 218 may provide the credentials to the portable USB device 102, and the portable USB device 102 may then utilize the credentials to access the secure content from the secure information module 220.

As implied, the secure information module 220 may be configured to manage the secure information (e.g., the firmware updates and/or the cryptographic keys). Additionally, the memory 214 may store access credentials and/or other user information such as, but not limited to, user IDs, passwords, and/or other user information. In some examples, the user information may include information for authenticating an account access request such as, but not limited to, a device ID, a cookie, an IP address, a location, or the like. In addition, the user information may include a user provided response to a security question or a geographic location obtained by the portable USB device 102. In some embodiments, the secure information module 220 may be configured to utilize location information (GPS information, RFID information) or network connectivity information provided by the portable device 102 to trigger the destruction of the data stored in the volatile memory 106 of the portable device 102. In various embodiments, the secure information module 220 may be configured to generate and maintain one or more virtual barriers that correspond to a geo-fence or network connectivity range that serve as triggers to destroy the data stored in the volatile memory 106. The secure information module 220 may send instructions to the portable device 102 that causes the one or more associated capacitors (108 for example) to stop providing current to the volatile memory or accelerate the expenditure of the charge so as to drain the capacitors of a stored charge.

In some aspects, the portable USB device 102 may also be any type of computing devices such as, but not limited to, a USB drive, a mobile phone, a smart phone, a personal digital assistant (PDA), a laptop computer, a desktop computer, a server computer, a thin-client device, a tablet PC, etc. In some examples, the portable USB device 102 may be in communication with the computer device 112 via the USB connection and/or the service provider computers 204 via the networks 206, via other network connections, or via a USB connection. The portable USB device 102 may also include geo-location devices (e.g., a global positioning system (GPS) device or the like) for providing and/or recording geographic location information associated with the portable USB device 102

In one illustrative configuration, the portable USB device 102 may include at least one non-volatile memory 104 and one or more processing units (or processor(s)) 227. The processor(s) 227 may be implemented as appropriate in hardware, computer-executable instructions, firmware, or combinations thereof. Computer-executable instruction or firmware implementations of the processor(s) 227 may include computer-executable or machine-executable instructions written in any suitable programming language to perform the various functions described.

The non-volatile memory 104 may store program instructions that are loadable and executable on the processor(s) 227, as well as data generated during the execution of these programs, and/or unique identifiers of the portable USB device 102 (e.g., MAC address, etc.). Depending on the configuration and type of portable USB device 102, the non-volatile memory 104 may be read only memory (ROM), flash memory, or the like. The portable USB device 102 may also include additional storage 228, which may include removable storage and/or non-removable storage. The additional storage 228 may include, but is not limited to, random access memory (RAM), magnetic storage, optical disks and/or tape storage. The disk drives and their associated computer-readable media may provide non-volatile storage of computer-readable instructions, data structures, program modules and other data for the computing devices. In some implementations, the non-volatile memory 104 may include multiple different types of non-volatile memory. Additionally, the volatile memory 106 may include, but is not limited to, RAM, parallel random access memory (PRAM), static random access memory (SRAM), dynamic random access memory (DRAM), synchronous dynamic random access memory (SDRAM), or other memory technology.

The non-volatile memory 104, the volatile memory 106, and the additional storage 228, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The non-volatile memory 104 and the additional storage 228 are all examples of computer storage media. Additional types of computer storage media that may be present in the portable USB device 102 may include, but are not limited to, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the portable USB device 102. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The portable USB device 102 may also contain communications connection(s) 229 (e.g., the USB connector 103 as shown in FIG. 1) that allow the portable USB device 102 to communicate with the computer device 112, a stored database, another computing device or server, user terminals, and/or other devices on the networks 206. Turning to the contents of the non-volatile memory 104 in more detail, the non-volatile memory 104 may include an operating system 232 and/or one or more application programs or services for implementing the features disclosed herein including a controller module 234, an authentication module 240, and/or a location module 242. In some examples, the controller module 234 may be configured to control the operations of the portable USB device 102 (e.g., establishing USB connections, managing power, sending and/or receiving data requests between the computer device 112 and the service provider computers 204, storing the secure data in the volatile memory 106, and/or activating one or more of the other modules 234, 240, 242). In some examples, the OS 232 and the controller module 234 may work together to control the portable USB device 102.

In some examples, the volatile memory 106 may be configured to manage temporary storage of the secure information (e.g., firmware updates, data blocks, computer images, and/or cryptographic keys) from the service provider computers 204 or from other entities. Additionally, in some examples, the volatile memory 106 may also be configured to manage block data storage for downloading the block data to the portable USB device 102 or for uploading the block data from the portable USB device 102 to the service provider computers 204. In this way, the portable USB device 102 may also act a gateway for backing up or otherwise storing entire blocks or images of data from the computer device 112 to a storage service of the service provider computers.

Additionally, as noted, the volatile memory 106 may be utilized by the portable USB device 102 to provide firmware update information, sensitive data, driver updates, or other information from the service provider computers 204 to appropriate hardware components of the computer device 112. In this way, data center security (e.g., of the service provider computers 204) may be maintained while providing reusable securely erased USB flash drives for use by users of the data center. Additionally, in some examples, the volatile memory 106 by nature of securely destroying stored data after an amount of time may be configured to store the newest version of firmware, latest driver patch, or other information for each particular hardware component or computer device, thus ensuring that updates are always done with the most recent version and no older versions or out of date data are inadvertently floating around on flash drives. In some examples, the volatile memory 106 managed by the controller module 234. The volatile memory 106 may be small or large. If desired, the volatile memory 106 may also be used to mimic a writeable drive while operating from a read-only file server, by storing data written by the computer device 112 in RAM without forwarding that data to the service provider computers 204 or any other entity.

Additionally, in some examples, the volatile memory 106 may be configured to manage credentials used to access the service provider computers 204. However, in other examples, the credentials may be stored in the non-volatile memory 104. Additionally, in some examples, the volatile memory 106 may be configured to store cryptographic information provided by the service provider computers 204. For example, some computing devices may include "secure boot," "trusted boot," or "verified boot" features to verify the integrity of an OS, a bootloader, and/or a basis input/output system (BIOS) file. In some examples, these features may be implemented by using cryptographic keys stored in the non-volatile memory 104. If tampering with the OS or other software is detected, the computing device may operate in a degraded mode or might refuse to boot at all. In this case, the cryptographic keys that could enable the special boot features may be requested and/or received by the portable USB device 102 from the service provider computers 204.

In some examples, the controller module 234 may be configured to establish a wireless or wired network connection with one or more other computing devices via the networks 206. Specifically, the controller module 234 may establish a connection with the service provider computers 204 or other computing devices capable of providing sensitive data, firmware updates, and/or cryptographic keys. Additionally, in some examples, the authentication module 240 may be configured to provide, receive, and/or manage authentication credentials for the portable USB device 102. For example, the authentication module 240 may be configured to manage storage of any credentials in at least a portion of the non-volatile memory 104 of the portable USB device 102. While this may risk the leak of the credential information if the portable USB device 102 leaves the data center (e.g., of the service provider computers 204), the service provider computers 204 may be configured to restrict use of the credentials to a specific WiFi or Ethernet network (or to a specific MAC address) so that the credentials may not be utilized by a rogue device or the like via the secure information module 220 and the location module 242. Further, in some examples, the credentials could be retrieved by the portable USB device 102 at startup via a network boot protocol such as Dynamic Host Configuration Protocol (DHCP) or via a Preboot Execution Environment (PXE), and then stored in the volatile memory 106.

As such, the credentials may be erased or otherwise dereferenced when power is no longer supplied to the portable USB device 102. Further, in some examples, the controller module 23 and location module 242 may be configured to erase or otherwise decommission a portable USB device 102 based at least in part on information indicating that the portable USB device 102 has been stolen or otherwise compromised. In particular embodiments, the location module 242 may obtain and maintain location information (GPS information, RFID information, and/or network connectivity information) for triggering the destruction of the data stored in the volatile memory 106. The location information may be provided to the secure information module 220 via networks 206. In some embodiments either the service provider computers 204 and secure information module 220 or the location module 242 and portable device 102 independent of computers 204 and module 220 may trigger the capacitors to prevent providing current to the volatile memory 106 and thus cause the destruction of the data stored thereon. In some embodiments, the controller module 234 may be configured to receive and process an indication and/or input from a mechanical switch (310 from FIG. 3) that triggers the destruction of the data stored in the volatile memory 106. For example, upon a user interaction with the mechanical switch (310), the control module 234 may provide instructions that cause the capacitors to stop providing current to the volatile memory 106 or quickly discharge any stored charge.

A few additional examples of the operations of the portable USB device 102 are also described in greater detail below with reference to FIGS. 3-6.

Figure 3:
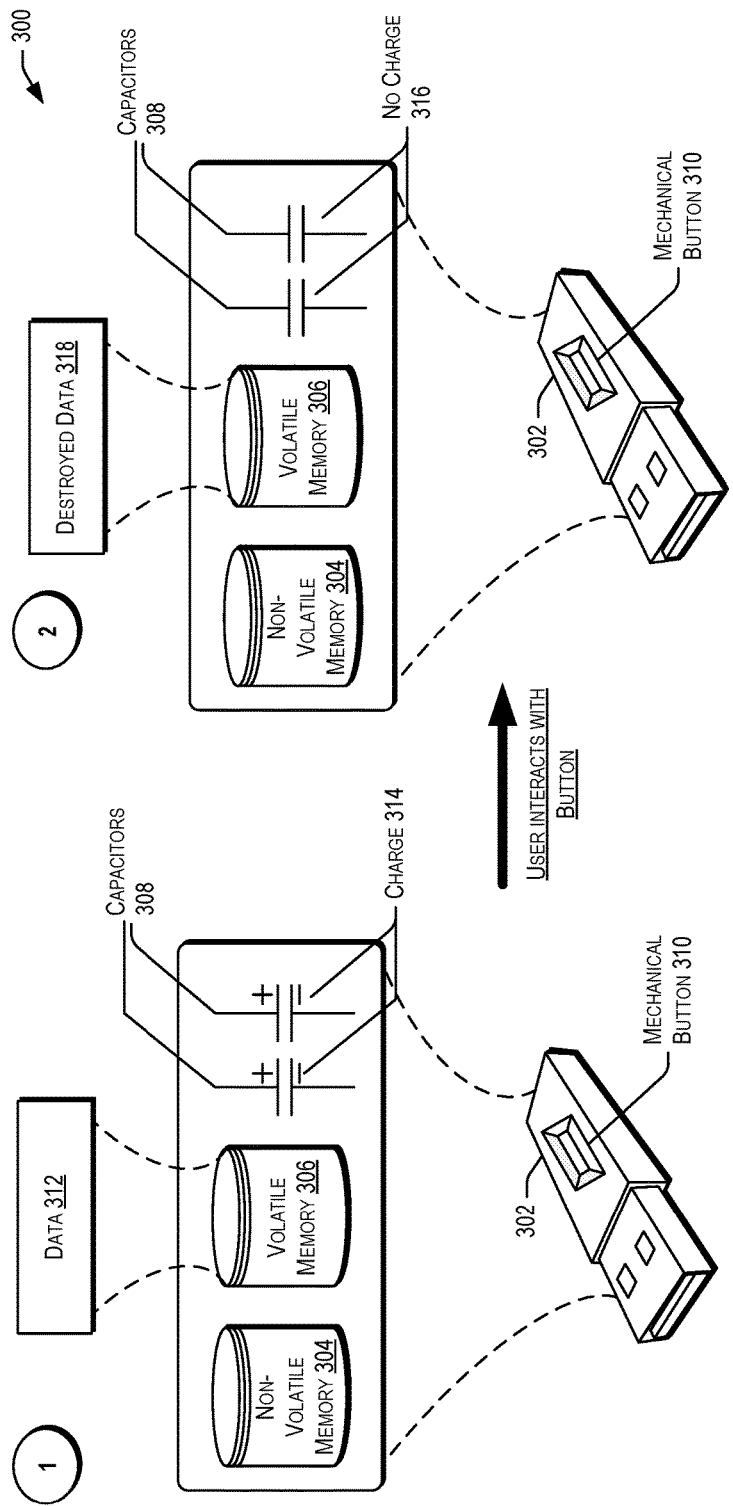
FIG. 3 illustrates an example data flow for describing the secure erasure of data on a portable storage device as described herein, according to at least one embodiment.

FIG. 3 illustrates an example data flow for describing the secure erasure of data on a portable storage device as described herein, according to at least one embodiment. The illustrative environment 300 includes, at step 1, a portable storage device 302 that includes non-volatile memory 304, volatile memory 306, one or more capacitors 308, and a mechanical switch or button 310. As described in FIG. 1, the portable storage device 302 may be configured to store data 312 in the volatile memory 306 so long as power is supplied by a connected device or the capacitors 308. In the illustrative environment 300 at step 1, the portable storage device 302 depicts data 312 stored in the volatile memory 306 and the capacitors 308 storing a charge 314. In some embodiments, a service provider computer can provide instructions to produce and/or manufacture one or more portable storage devices (such as 302) that include components 304, 306, 308, and 310, or any suitable combination of components.

Further, instructions may be generated and provided to configure the volatile memory 306 size and refresh rate as well as the size and number of capacitors 308. Thus, various portable storage devices may be generated that provide varying amounts of time that the volatile memory 306 will store the data 312 when disconnected or not interacting with a computer device that serves as a power source. The amount of time is determined based on factors such as data access speed, size and refresh rate of the volatile memory, type of volatile memory, and size and number of capacitors. The illustrative environment 300 at step 2 occurs upon the user interacting with the mechanical button 310. As a result of interacting with the mechanical button (either by pushing, sliding or moving the mechanical button) the capacitors 308 no longer have a charge 316. As such, the portable storage device 302 and the corresponding volatile memory 306 has destroyed the data 318 and the volatile memory 306 no longer stores any data. In various embodiments, an indication of user interaction with the mechanical button 310 is provided to a processor and instructions stored in the non-volatile memory 304 enable the capacitors to stop or discharge the current to the volatile memory 306. In some embodiments, the volatile memory 306 may be configured to respond to the interaction of the mechanical button 310 to cease providing or discharge the current to the volatile memory 306 thus causing the destruction of the data 318. In some embodiments, the discharge of the current to the volatile memory 306 may be accelerated or the volatile memory 306 can discharge the current at an accelerated rate that corresponds to a rate greater than the rate required to maintain the stored data 312 in the volatile memory 306. In particular embodiments, one or more resistors may be associated with the portable storage device 302 for preventing the overheating of the volatile memory 306 in embodiments where the current is provided by the capacitors 308 at an accelerated rate thereby causing the destruction of the data 312 stored in the volatile memory 306.

Figure 4:
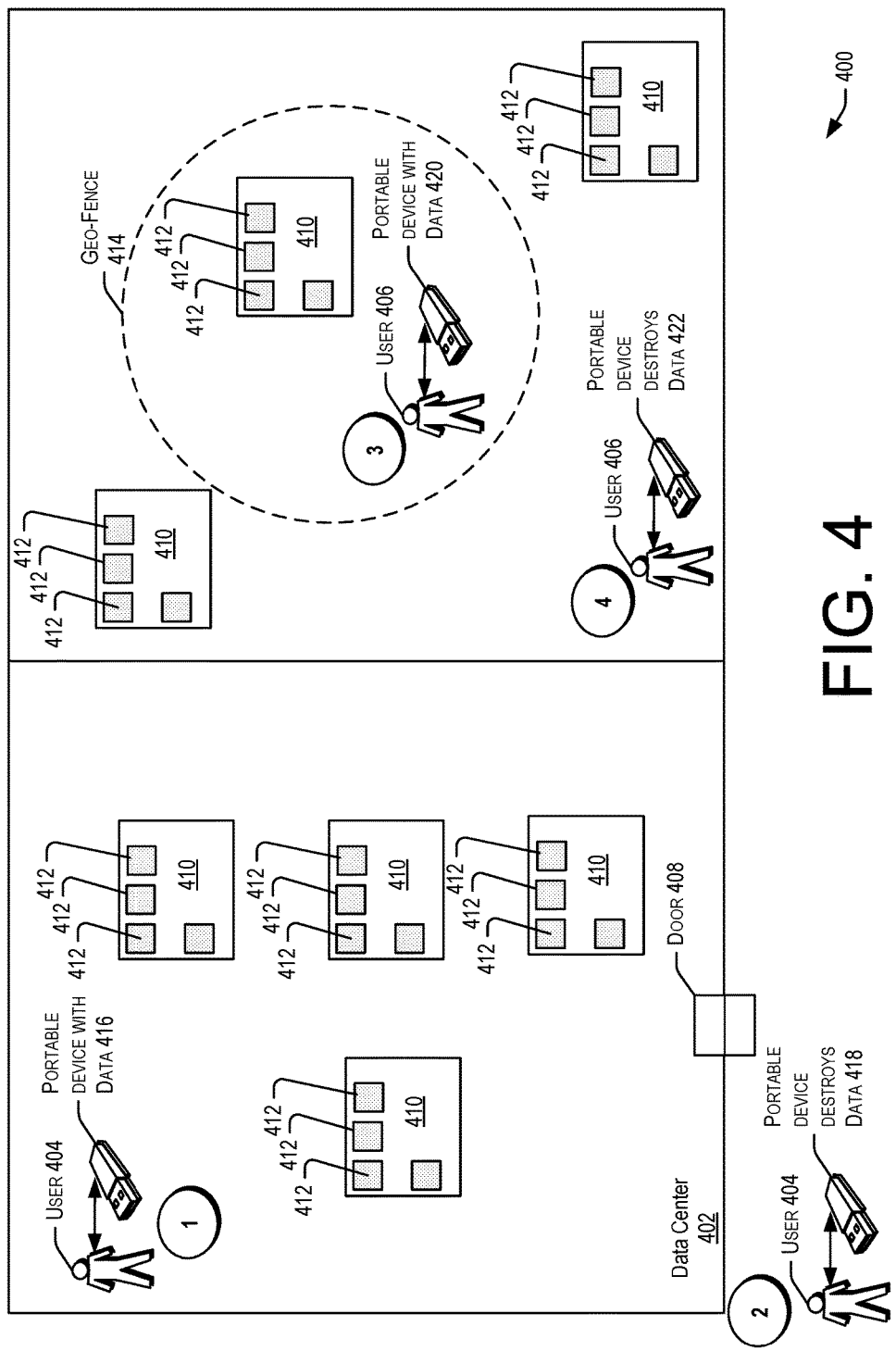
FIG. 4 illustrates an example data flow for describing the secure erasure of data on a portable storage device as described herein, according to at least one embodiment.

FIG. 4 illustrates an example data flow for describing the secure erasure of data on a portable storage device as described herein, according to at least one embodiment. The illustrative environment 400 of FIG. 4 includes a data center 402, users 404 and 406, a door 408 to the data center, a plurality of server racks 410 with corresponding storage devices 412, and a geo-fence 414. At step 1, the user 404 is moving portable device with data 416 throughout the data center 402. In particular embodiments, the user 404 may transfer data from portable device 416 to storage devices 412 in server racks 410. Upon the user 404 disconnecting the portable device with data 416 from the storage devices 412 and server racks 410 the user attempts to move outside the data center 402 via the door 408 at step 2. However, as described herein, the portable device with data 416 is configured to storage a charge utilizing one or more associated capacitors of the portable device to provide a finite amount of current to the volatile memory and maintain the data stored thereon. Upon the capacitors failing to provide the current to the volatile memory, the portable device destroys the data 418 by nature of the volatile memory lacking the power to refresh and maintain the data. Embodiments disclosed herein provide systems and methods that prevent a user (404) from removing sensitive data from a location (such as data center 402). The nature of the portable storage device storing data in the volatile memory and capacitors configured to hold a finite amount of charge to power the volatile memory which when removed causes the destruction of the data stored in the portable storage device.

The illustrative environment 400 also includes a user 406 utilizing a portable device with data 420 to transfer data to and between the portable device 420 and the storage devices 412 and server racks 410 of the data center 402. As described herein, the portable storage device 420 may be configured to utilize GPS, RFID, or wireless connectivity components to provide relative location information of the portable storage device 420 to other devices, such as a service provider computer 204. The data center 402 may incorporate one or more geo-fences 414 provided by the service provider computer 204 to set up virtual barriers which when crossed cause the destruction of data stored in the volatile memory of portable device 420. For example, as depicted in FIG. 4, as the user 406 moves beyond the geo-fence 414, the portable storage device 422 destroyed the data stored in the corresponding volatile memory. As described herein, instructions may be received and processed by the portable device 420 that cause associated capacitors to cease providing a current to the volatile memory or discharge the current so as to cause the volatile memory to lack a power source. Upon the volatile memory losing power the data stored thereon is destroyed. In some embodiments, the portable storage device 420 destroyed the data 422 without instructions from a service provider computer 204 as an associated processor and computer-readable storage medium may include instructions and applications for determining whether a virtual barrier has been crossed such that the data must be destroyed. In some embodiments, the portable device with data 416 may be associated or configured to utilize one or more temperature sensors for tracking and maintaining a temperature of the portable storage device 416 during use. In particular embodiments, the volatile memory may be configured to erase and/or destroy the data stored in the volatile memory in response to the temperature of the portable storage device being outside of a temperature range. One or more temperature thresholds may be maintained and obtained temperatures of the portable storage device may be compared to a threshold to determine whether the data stored in the volatile memory should be destroyed.

Figure 5:
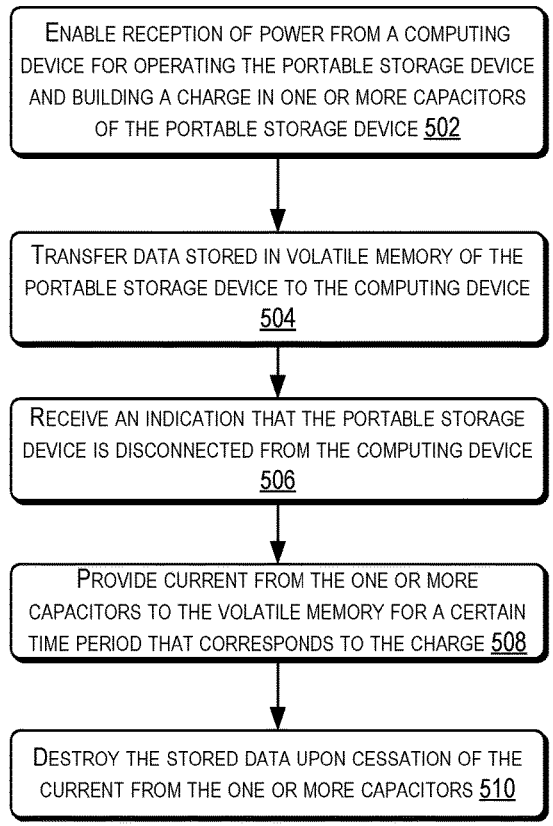
FIG. 5 illustrates an example flow diagram of a process for describing the secure erasure of data on a portable storage device as described herein, according to at least one embodiment.
Figure 6:
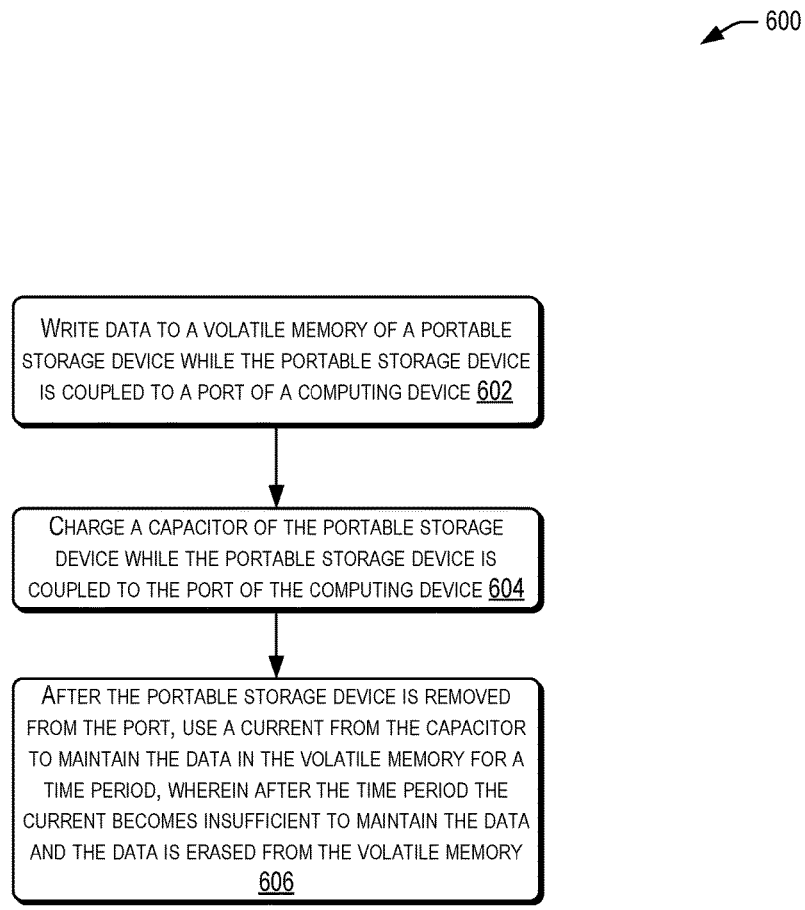
FIG. 6 illustrates another example flow diagram of a process for describing the secure erasure of data on a portable storage device as described herein, according to at least one embodiment.

FIGS. 5 and 6 illustrate example flow diagrams of a process for describing the secure erasure of data on a portable storage device as described herein, according to embodiments. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, some, any, or all of the process (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. As noted below, the code may be stored on a computer-readable storage medium, for example, in the form of a computer program including a plurality of instructions executable by one or more processors. The computer-readable storage medium may be non-transitory.

In some examples, the portable device 102 (e.g., utilizing at least one of non-volatile memory 104, an authentication module 240, a controller module 234, a location module 242, and volatile memory 106) as well as the computer device 112 shown in FIG. 2 may perform the processes 500 and 600 of FIGS. 5 and 6. In FIG. 5, the process 500 may include enabling reception of power from a computing device for operating a portable device and building a charge in one or more capacitors of the portable device at 502. In some embodiments, the portable device may comprise non-volatile memory that stores computer-executable instructions, volatile memory configured to store data, one or more capacitors configured to store a charge and provide current to the volatile memory independent of a connection with a computing device, and a processor configured to access the non-volatile memory and the volatile memory. In some embodiments, the process 500 may include transferring data stored in the volatile memory to the computing device at 504. For example, a user may connect the portable device to the computing device via a USB connection or any other suitable connection to begin transferring data between the devices. In some embodiments, data may be transferred from the computing device to the volatile memory of the portable device. In various embodiments, while the portable device is connected to the computing device, the one or more capacitors of the portable device may storage a charge that may provide power (current) to the volatile memory when the portable device is disconnected from the computing device or any other suitable device.

The process 500 may include receiving an indication that the portable device is disconnected from the computing device at 506. For example, in a data center use case, a user may transfer data between the portable device and a plurality of computing devices and/or storage devices in the data center. Each time the portable device is disconnected or no longer interacting with a computing device the data stored on the volatile memory is only maintained while a current is provided by the one or more capacitors. Thus, when the portable device is not connected to a computing device for an amount of time the capacitor will cease to provide the current to the volatile memory which will result in the secure erasure of the stored data in the volatile memory. The process 500 may include providing current from the one or more capacitors to the volatile memory for a certain time period that corresponds to the charge stored by the one or more capacitors at 508. As described herein, a service provider may configure or provide instructions to build a portable storage device with particular combinations of volatile memory and capacitor(s) that result in a time period that the portable device will store the data in the volatile memory before the capacitors cease to provide current thus erasing the stored data. As such, when a portable device is removed, disconnected, or no longer interacting with a computing device, the volatile memory is configured to store the data only as long as power (current) is provided by the associated capacitor. This provides a reusable portable storage device that ensures secure erasure of data after a time period of inactivity (transfer of data or interaction with another computer device). The process 500 may conclude at 510 by destroying the stored data upon cessation of the current from the one or more capacitors. In particular embodiments, the processor may execute instructions represented as firmware of the portable storage device that are stored in the non-volatile memory to stop providing current to the volatile memory thus resulting in the destruction of the data stored thereon. In some embodiments, the firmware includes instructions for providing current from the capacitors to the volatile memory as long as a charge exists but still resulting in the destruction of the data stored in the volatile memory upon the cessation of providing the current from the capacitors.

In FIG. 6 the process 600 may include writing data to a volatile memory of a portable storage device while the portable storage device is coupled to a port of a computing device at 602. For example, an information technology (IT) user may wish to provide updates such as drivers or other secure data from a work computer device to a customer computer device. The IT user may connect the portable storage device to their work computer to store the drivers and store a charge in a capacitor of the portable storage device. The data may be stored in the volatile memory of the portable storage device. The process 600 may include charging a capacitor of the portable storage device while the portable storage device is coupled to the port of the computing device at 604. While connected the portable storage device may store and/or build the charge in an associated capacitor.

The process 600 may conclude at 606 by, after the portable storage device is removed from the port, using a current from the capacitor to maintain the data in the volatile memory for a time period, wherein after the time period the current becomes insufficient to maintain the data and the data is erased from the volatile memory. For example, as the IT user completes the transfer of data to the customer computer device, the portable storage device may be disconnected and placed on a nearby surface. As described herein, the capacitor of the portable storage device may be configured to provide a current for an amount of time to the volatile memory allowing a refresh operation to occur which will result in the data stored thereon being maintained. However, upon the capacitor failing to provide the current the volatile memory will lack the power to refresh and all data stored will be destroyed. Thereafter, the IT user may reuse the portable storage device ensuring that all previously stored data is securely erased and that any malicious data (viruses, Trojans, worms, etc.,) has been erased from the portable storage device as well.

Figure 7:
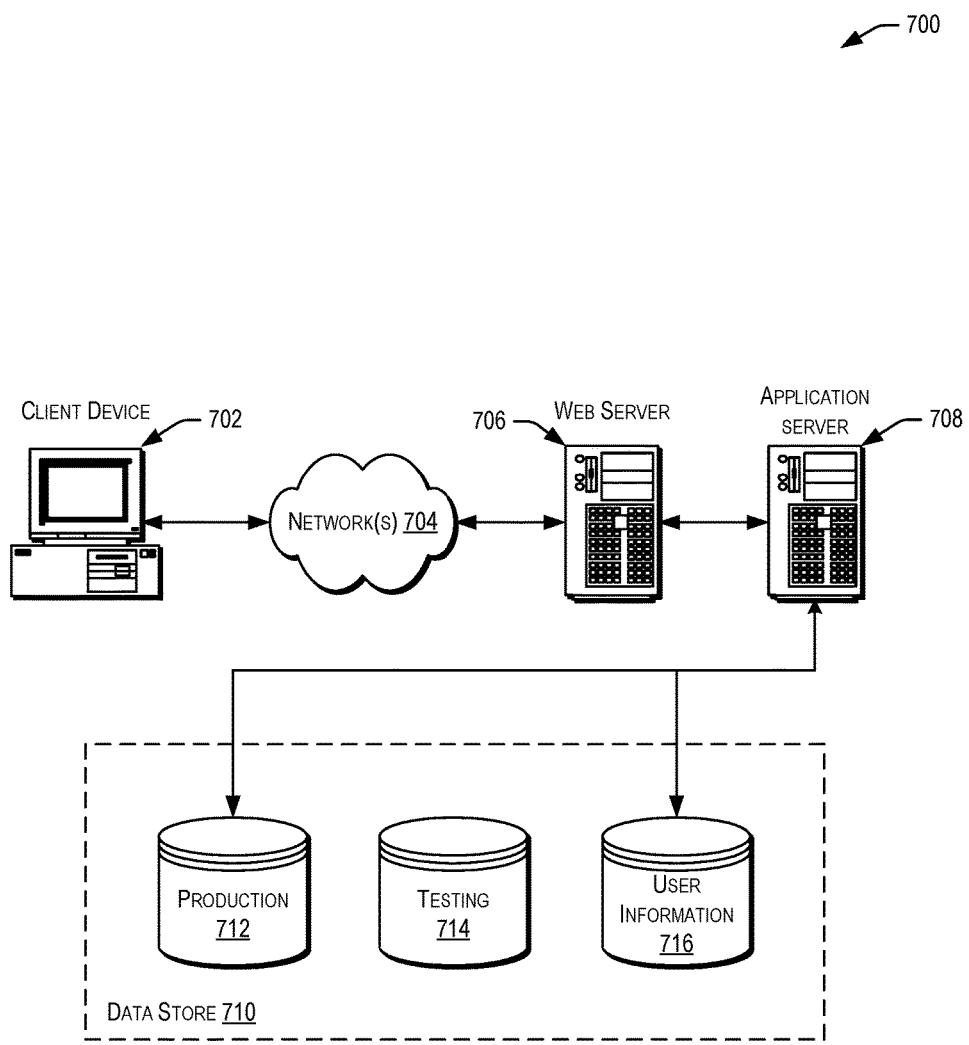
FIG. 7 illustrates an environment in which various embodiments of the secure erasure of data from a portable device described herein can be implemented, according to at least one embodiment.

FIG. 7 illustrates aspects of an example environment 700 for implementing aspects in accordance with various embodiments. As will be appreciated, although a Web-based environment is used for purposes of explanation, different environments may be used, as appropriate, to implement various embodiments. The environment includes an electronic client device 702, which can include any appropriate device operable to send and receive requests, messages, or information over an appropriate network 704 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 702 and the application server 708, can be handled by the Web server. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log data 714, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a type of item. In this case, the data store might access the user information to verify the identity of the user and can access the catalog detail information to obtain information about items of that type. The information then can be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In some embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A portable storage device, comprising:
a non-volatile memory that stores firmware instructions;
a volatile memory;
a processor configured to access the non-volatile memory and the volatile memory, wherein the processor is configured to execute the firmware instructions to:
store data in the volatile memory when the portable storage device is connected to a first computing device;
read the stored data from the volatile memory when the portable storage device is connected to a second computing device; and
a capacitor configured to storage a charge from the first or second computing device while the portable storage device is connected to the first or second computing device, and to provide a current to the volatile memory when the portable storage device is not connected to the first or second computing device, wherein the stored data is erased from the volatile memory based at least in part on the provided current becoming insufficient to maintain the stored data in the volatile memory and upon expiration of an amount of time, the amount of time determined based on user input provided to the portable storage device.

2. The portable storage device of claim 1, wherein the processor is further configured to communicate with a service provider computer to authenticate the portable storage device prior to transferring the stored data to the second computing device.

3. The portable storage device of claim 1, wherein the non-volatile memory is further configured to store authentication information that is unique to the portable storage device.

4. The portable storage device of claim 1, further comprising a Universal Serial Bus (USB) interface, wherein the capacitor is configured to receive the charge over the USB interface.

5. A storage device, comprising:
a capacitor, wherein the capacitor is configured to be charged by a computing device, when the storage device is connected to the computing device, to store a charge corresponding to an amount of time, the amount of time based on user input provided to the storage device;
a volatile memory configured to store data, and wherein the volatile memory is coupled to the capacitor and configured to receive a current from the capacitor when the storage device is not connected to the computing device; and
a processor, wherein the stored data is erased from the volatile memory when the storage device is disconnected from the computing device, and the current received from the capacitor becomes insufficient to maintain the stored data in the volatile memory.

6. The storage device of claim 5, further comprising a switch component configured to drain the capacitor of a stored charge upon a user interaction.

7. The storage device of claim 6, wherein draining the capacitor of the stored charge includes discharging the charge without providing the current to the volatile memory.

8. The storage device of claim 5, further comprising a geolocation system, wherein the volatile memory is configured to erase the stored data based in part on location information from the geolocation system and a virtual barrier that corresponds to a geo-fence.

9. The storage device of claim 5, further comprising a wireless network component configured to connect to a particular wireless network and maintain information that tracks wireless network connectivity of the first storage device.

10. The storage device of claim 9, wherein the volatile memory is configured to erase the stored data based on the information from the wireless network component indicating a disconnect from the particular wireless network or a connection to a different wireless network.

11. The storage device of claim 5, wherein the capacitor is configured to discharge a stored charge at a particular discharge rate compared to a discharge rate associated with maintaining the stored data in the volatile memory.

12. The storage device of claim 5, wherein the volatile memory is configured to store new data in response to an indication that the first storage device is interacting with another computing device and subsequent to erasing the stored data in the volatile memory.

13. The storage device of claim 5, further comprising a temperature sensor for obtaining a temperature of the first storage device and maintaining information that tracks the obtained temperature of the first storage device.

14. The storage device of claim 5, wherein the volatile memory is further configured to erase the stored data on the volatile memory based in part on the information about the temperature of the first storage device being outside of a temperature range.

15. A computer-implemented method, comprising:
writing data to a volatile memory of a portable storage device while the portable storage device is coupled to a port of a computing device;
charging a capacitor of the portable storage device while the portable storage device is coupled to the port of the computing device; and
after the portable storage device is removed from the port, using a current from the capacitor to maintain the data in the volatile memory for a time period, wherein after the current becomes insufficient to maintain the data and upon expiration of the time period the data is erased from the volatile memory, the time period determined based on user input provided to the portable storage device.

16. The computer-implemented method of claim 15, further comprising providing, via a user interface of the portable storage device, a representation of a charge stored by the capacitor.

17. The computer-implemented method of claim 15, further comprising, in response to an indication identifying that the capacitor is not at a maximum charge, erasing the data in the volatile memory of the portable storage device.

18. The computer-implemented method of claim 15, wherein the time period is further determined based at least in part on a capacitance in the portable storage device.

* * * * *